US012687876B2

(12) United States Patent
Pinchback

(10) Patent No.: US 12,687,876 B2
(45) Date of Patent: Jul. 21, 2026

(54) BANDGAP CIRCUIT HAVING A HIGH-ORDER CURVATURE COMPENSATION CURRENT GENERATING CIRCUIT

(71) Applicant: KeyTek Semiconductor HongKong Limited, HongKong (CN)

(72) Inventor: Mark A. Pinchback, Healdsburg, CA (US)

(73) Assignee: KeyTek Semiconductor HongKong Limited, HongKong (CN)

( * ) Notice: Subject to any disclaimer, the term of this patent is extended or adjusted under 35 U.S.C. 154(b) by 257 days.

(21) Appl. No.: 18/406,123

(22) Filed: Jan. 6, 2024

(65) Prior Publication Data

US 2025/0224753 A1 Jul. 10, 2025

(51) Int. Cl.
*G05F 3/26* (2006.01)
*G05F 3/30* (2006.01)

(52) U.S. Cl.
CPC .............. *G05F 3/262* (2013.01); *G05F 3/267* (2013.01); *G05F 3/30* (2013.01)

(58) Field of Classification Search
CPC ............. G05F 3/30; G05F 3/262; G05F 3/267
See application file for complete search history.

(56) References Cited

U.S. PATENT DOCUMENTS 5,291,122 A * 3/1994 Audy ........................ G05F 3/30 323/907
5,391,980 A 2/1995 Thiel et al. ................... 323/314
5,434,532 A 7/1995 Thiel ............................. 327/531
6,157,245 A 12/2000 Rincon-Mora ............... 327/539
(Continued)

FOREIGN PATENT DOCUMENTS

DE 102015122521 A1 * 6/2017 ............... G05F 3/30

OTHER PUBLICATIONS

Thakral et al., "Design of Squarer Circuit in Sub-threshold Mode", International Journal of Engineering & Technology, 7 (2.11), pp. 38-40 (2018).
(Continued)

*Primary Examiner* — Crystal L Hammond
*Assistant Examiner* — Jennifer C Caulk
(74) *Attorney, Agent, or Firm* — Imperium Patent Works LLP; T. Lester Wallace

(57) ABSTRACT

A bandgap reference voltage generating circuit includes a bandgap cell, a tail resistor circuit, a high-order curvature compensation current generating circuit, an $I_{ZTAT}$ current sink circuit, and a start-up circuit. The bandgap cell has a base current redistribution circuit that drives the bases of the bipolar transistors using a first base resupply current taken from the first current leg of the cell, and that uses a matched second base resupply current taken from the second current leg of the cell. $V_{BG}$ error due to bipolar current gain variation is reduced. The N-channel transistors of the curvature compensation current generating circuit operate in the near threshold region. The output current of the compensation circuit varies as power of approximately 2.1 of the input current. The tail resistor circuit is programmable in various ways so that the amount of curvature correction can be tailored and trimmed.

22 Claims, 7 Drawing Sheets

(56) References Cited

U.S. PATENT DOCUMENTS

| | | | | |
|---|---|---|---|---|
| 6,750,641 | B1 | 6/2004 | Ivanov et al. | 323/315 |
| 7,253,597 | B2 | 8/2007 | Brokaw | 323/314 |
| 7,420,359 | B1 | 9/2008 | Anderson et al. | 323/316 |
| 7,728,575 | B1 | 6/2010 | Ozalevli et al. | 323/313 |
| 7,915,947 | B2 | 3/2011 | Liu et al. | 327/512 |
| 9,372,496 | B2 | 6/2016 | Arnold | G05F 3/267 |
| 10,890,935 | B2 | 1/2021 | Mouret et al. | G05F 3/267 |
| 11,088,699 | B1 | 8/2021 | Vishwanath et al. | H03M 1/06 |
| 2009/0302823 | A1 * | 12/2009 | Chao | G05F 3/30 323/313 |
| 2021/0263549 | A1 * | 8/2021 | Kanoun | G05F 3/30 |

OTHER PUBLICATIONS

Shen et al., "A Curvature Compensation Technique for Low-Voltage Bandgap Reference", Energies 2021, 14, 7193, MDPI, 12 pages (Nov. 2, 2021).

P. Brokaw, "How to Marke a Bandgap Voltage Reference in One EASY Lesson", 60 pages (2011).

J. Calvillo, Thesis: "Design of Bandgap Voltage Reference with Curvature Compensation for the Space Industry", Tecnio Lisboa, 103 pages (Oct. 2016).

* cited by examiner

BANDGAP REFERENCE VOLTAGE GENERATING CIRCUIT

| | |
|---|---|
| VBG Ref Output | 1.1465 +/1 1.0mV, Trimmed -40C to +125C |
| Temp Coeff. | typ ± 3 ppm/C, Box method, max 10ppm/C Box method, Trimmed at room temperature only. |
| Temp Coeff. | 16ppm/C Box method, untrimmed over PVT. |
| Analog Supply Voltage | AVDD = 5.7V to 4.3V |
| Supply Current | 300uA at 26C |
| Temp Range | Meets TC spec -40C to +125C |
| Operating Temp Range | -60C to +160C |
| Circuit Area | <0.3 sq mm (HARD IP CORE) |
| Trimm | Trim to 1.1465 +/- 500uV@25C nom +/-5C |
| Process | Vanguard International Semi Corp. 150 nm BCD |

BANDGAP VOLTAGE REFERENCE GENERATOR

FIG. 2

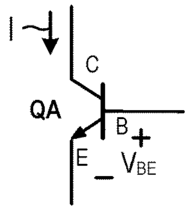

OVERALL $V_{BE}$ IS CTAT $$V_{BE} = \frac{kT}{q} \ln\left(\frac{I_o}{I_s}\right)$$

THIS TERM IS WEAKLY PTAT

THIS TERM IS STRONGLY CTAT $V_{BE}$ OF QA IS CTAT

FIG. 3

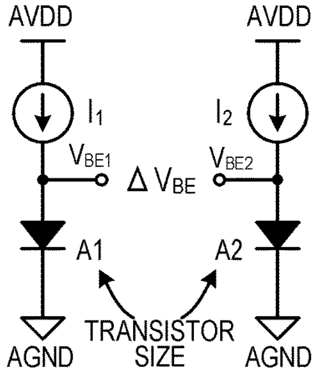

$$\Delta V_{BE} = V_{BE1} - V_{BE2}$$

$$\Delta V_{BE} = V_T \ln\left(\frac{I_1}{I_{s1}}\right) - V_T \ln\left(\frac{I_2}{I_{s2}}\right)$$

$$\Delta V_{BE} = V_T \ln\left(\frac{I_1 \, I_{s2}}{I_2 \, I_{s1}}\right)$$

BUT $I_1 = I_2$ DUE TO CURRENT MIRROR $$\Delta V_{BE} = V_T \ln\left(\frac{I_{s2}}{I_{s1}}\right)$$

$$\Delta V_{BE} = V_T \ln\left(\frac{q\,A2\,n_i^2\left(\frac{1}{N_D}\sqrt{\frac{D_P}{\tau_P}} + \frac{1}{N_A}\sqrt{\frac{D_N}{\tau_N}}\right)}{q\,A1\,n_i^2\left(\frac{1}{N_D}\sqrt{\frac{D_P}{\tau_P}} + \frac{1}{N_A}\sqrt{\frac{D_N}{\tau_N}}\right)}\right)$$

$$\Delta V_{BE} = V_T \ln\left(\frac{A2}{A1}\right)$$

TEMPERATURE $$\Delta V_{BE} = T\,\frac{k}{q} \ln\left(\frac{A2}{A1}\right)$$

$\Delta V_{BE}$ IS PTAT

THIS TERM IS CONSTANT WITH TEMPERATURE $\Delta V_{BE}$ IS PTAT

FIG. 4

COMPARISON OF $V_{BG}$ WITH AND WITHOUT BASE CURRENT REDISTRIBUTION CIRCUIT - SCALED TO MATCH AT 25ºC

GILBERT TRANS-LINEAR CURRENT SQUARER CIRCUIT EMPLOYING BIPOLAR TRANSISTORS $$V_{BE4} + V_{BE3} - V_{BE2} - V_{BE1} = 0$$

$$V_T \ln\left(\frac{I_{OUT}}{I_S}\right) + V_T \ln\left(\frac{I_{INT}}{I_S}\right) - V_T \ln\left(\frac{I_{IN}}{I_S}\right) - V_T \ln\left(\frac{I_{IN}}{I_S}\right) = 0$$

$$\cancel{V_T} \ln\left(\frac{I_{OUT}}{I_S}\right) + \cancel{V_T} \ln\left(\frac{I_{INT}}{I_S}\right) - \cancel{V_T} \ln\left(\frac{I_{IN}}{I_S}\right) - \cancel{V_T} \ln\left(\frac{I_{IN}}{I_S}\right) = 0$$

$$\ln\left(\frac{I_{OUT} I_{INT}}{I_S^2}\right) = \ln\left(\frac{I_{IN}^2}{I_S^2}\right)$$

$$e^{\ln\left(\frac{I_{OUT} I_{INT}}{I_S^2}\right)} = e^{\ln\left(\frac{I_{IN}^2}{I_S^2}\right)}$$

$$\frac{I_{OUT} I_{INT}}{I_S^2} = \frac{I_{IN}^2}{I_S^2}$$

$$I_{OUT} = \frac{I_{IN}^2}{I_{INT}}$$

CURRENT SQUARER FUNCTION

TRANS-LINEAR LOOP EQUATION FOR BIPOLAR GILBERT TRANS-LINEAR CURRENT SQUARER

FIG. 8

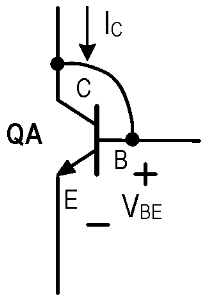

CURRENT

CONTROL VOLTAGE $$I_C \approx I_S\, e^{\left(\frac{V_{BE}}{\frac{kT}{q}}\right)}$$

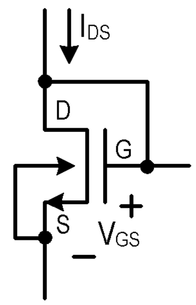

CURRENT

CONTROL VOLTAGE $$I_D \approx I_O \frac{W}{L} e^{\left(\frac{V_{GS}}{\frac{kT}{q}}\right)}$$

COMPARISON OF BIPOLAR TRANSISTOR TO N-CHANNEL MOS OPERATED IN SUB-THRESHOLD

FIG. 9

GILBERT TRANS-LINEAR
CURRENT SQUARER CIRCUIT EMPLOYING
SUB-THRESHOLD MOS TRANSISTORS

"NEAR THRESHOLD" REGION OF OPERATION

BANDGAP CIRCUIT HAVING A HIGH-ORDER CURVATURE COMPENSATION CURRENT GENERATING CIRCUIT

TECHNICAL FIELD

This disclosure relates to curvature compensation circuits and bandgap reference voltage generating circuits.

BACKGROUND INFORMATION

A bandgap reference voltage generating integrated circuit is desired that has a much lower temperature coefficient (TC) than is typical of simple bandgap circuits and that does this in such a way that the TC can be trimmed, in integrated circuit production, using a traditional "Magic Voltage" type trim with a single measurement, at a single temperature.

SUMMARY

A bandgap reference voltage generating circuit includes a Brokaw bandgap cell circuit, a tail resistor circuit, a high-order curvature compensation current generating circuit, and an $I_{ZTAT}$ current sink circuit. The bandgap reference voltage generating circuit generates a bandgap reference voltage $V_{BG}$ that is supplied onto a $V_{BG}$ bandgap output terminal and conductor. In one example, the $V_{BG}$ bandgap output voltage has a temperature coefficient ±3 ppm/C over PVT (over process variations, over a supply voltage range from 5.7 volts down to 4.3 volts, and over a temperature range from −40° C. to +125° C.).

The Brokaw bandgap cell circuit includes a current mirror including a first P-channel transistor and a second P-channel transistor, a first bipolar NPN transistor QA, a second bipolar NPN transistor QB, and a $\Delta V_{BE}$ sense resistor. A first current leg extends from the drain of the first P channel transistor of the current mirror to the collector of the first bipolar transistor QA. A second current leg extends from the drain of the second P channel transistor of the current mirror to the collector of the second bipolar transistor QB. The base electrodes of the bipolar transistors QA and QB are coupled together at a base node. The $V_{BG}$ bandgap output terminal is connected to, and is a part of, of this base node. The $\Delta V_{BE}$ sense resistor is coupled between the emitter of the first bipolar transistor QA and the emitter of the second bipolar transistor QB. A trimmable tail resistor circuit coupled between the emitter of the first bipolar transistor QA and a ground conductor.

In a first novel aspect, the Brokaw bandgap cell circuit further includes a base current redistribution circuit. The base current redistribution circuit is coupled to conduct a first base resupply current from a node on the first current leg and to supply that current onto the base node, and is also coupled to conduct a second base resupply current from a node on the second current leg and to supply that current onto the base node. The sum of the base resupply currents drawn from the first and second current legs provides the base currents flowing into the bases of the first and second bipolar transistors QA and QB. In one embodiment, the base current redistribution circuit includes a first N-channel transistor, a first resistor, a second N-channel resistor, and a second resistor. The drain of the first transistor is coupled to the first current leg so that it can draw the first base resupply current from the first current leg. The first resistor is coupled between the source of the first transistor and the base node. The drain of the second transistor is coupled to the second current leg so that it can draw the second base resupply current from the second current leg. The second resistor is coupled between the source of the second transistor and the base node. The gates of the first and second transistors of the base current redistribution circuit are coupled together. In one example, the gate voltage for the first and second transistors of the base current redistribution circuit is taken from a node on the first current leg.

In a second novel aspect, the high-order curvature compensation current generating circuit includes a P-channel current mirror and four N-channel transistors. The P-channel current mirror has a first current leg, a second current leg, and a third current leg. The magnitude of a second mirror current output by the second current leg is a fraction of the magnitude of a third mirror output current output by the third current leg. A first N-channel transistor has a source, a drain, and a gate. The gate is coupled to the drain and to a ground conductor. A second N-channel transistor has a source, a drain, and a gate. The source is coupled to the drain of the first N-channel transistor. The gate and drain of the second N-channel transistor are coupled together and are coupled to receive the third mirror output current from the third leg of the current mirror. A third N-channel transistor has a source, a drain and a gate. The gate of the third N-channel transistor is coupled to the gate of the second N-channel transistor. The source of the third N-channel transistor is coupled to the gate of a fourth N-channel transistor at a summing node. A sink current circuit is coupled to sink a sink current from the summing node. In addition, the second current leg of the current mirror is coupled to supply the second mirror output current onto the summing node. The source of the fourth N-channel transistor is coupled to the source of the first N-channel transistor at the ground conductor. The output current of the high-order curvature compensation current generating circuit is a drain current that flows into the fourth N-channel transistor. The four N-channel transistors operate in the near threshold region of operation. In one example, a first mirror output current supplied from the first current leg is an $I_{PTAT}$ current, the second mirror output current is an $I_{PTAT}/8$ current, the third mirror output current is an $I_{PTAT}/2$ current, and the sink current is an $I_{ZTAT}$ constant fixed current that has a substantially zero temperature coefficient of the temperature operating range of the circuit. In one embodiment of the overall bandgap reference voltage generating circuit, the output current from the high-order curvature compensation current generating circuit is mirrored so as to generate a plurality of identical output currents. Each of these output currents is supplied onto a selected one of a plurality of tap nodes on a resistor string of the tail resistor circuit.

Further details and embodiments and methods and techniques are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

FIG. 2 is a table that sets forth performance characteristics and specifications of the bandgap reference voltage generating circuit of FIG. 1

FIG. 3 is a diagram that illustrates how the CTAT voltage is generated using the first bipolar NPN transistor QA.

FIG. 4 is a diagram that illustrates how the PTAT voltage is generated.

FIG. 8 is an illustrative diagram that shows the trans-linear loop equation for a Gilbert trans-linear current squarer employing bipolar transistors.

FIG. 9 is an illustrative diagram that shows a comparison of the collector current $I_C$ flowing into a bipolar transistor and the drain-to-source current $I_{DS}$ flowing into an N-channel transistor operating in its sub-threshold region of operation.

DETAILED DESCRIPTION

Reference will now be made in detail to background examples and some embodiments of the invention, examples of which are illustrated in the accompanying drawings.

Figure 1:
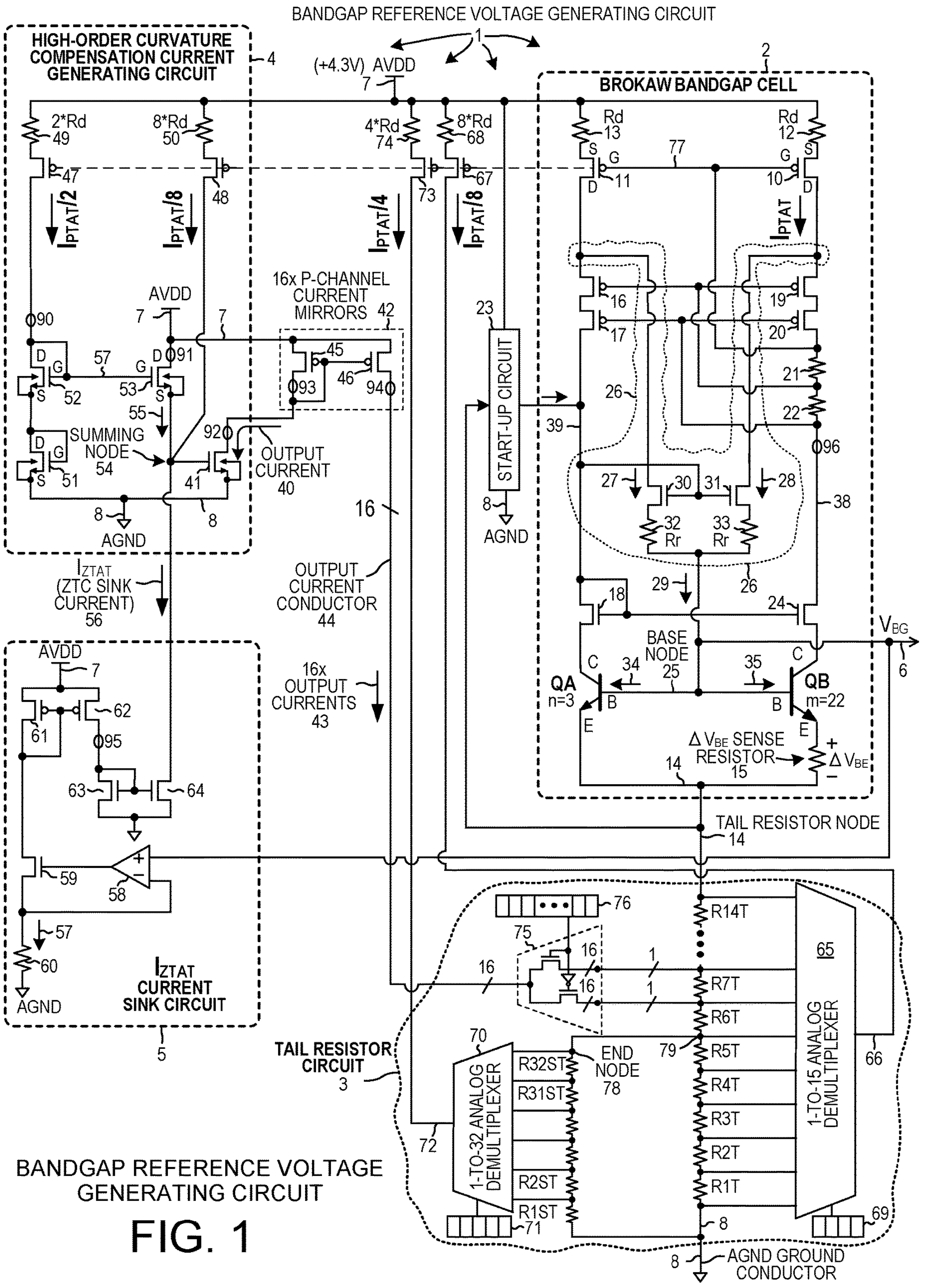
FIG. 1 is a simplified circuit diagram of one embodiment of a bandgap reference voltage generating circuit in accordance with the present invention.

FIG. 1 is a simplified circuit diagram of one embodiment of a bandgap reference voltage generating circuit 1 in accordance with the present invention.

FIG. 2 is a table that sets forth performance characteristics and specifications of the bandgap reference voltage generating circuit 1 of FIG. 1. The bandgap reference voltage generating circuit 1 outputs a bandgap reference voltage $V_{BG}$ (trimmable to 1.1465 volts at room temperature) and having a typical temperature coefficient of ±3 ppm per degree Celsius over PVT (over process variations, over an AVDD supply voltage range from 5.7 volts down to 4.3 volts, and over a temperature range from −40° C. to +125° C.). The circuit achieves this performance in such a way that the temperature coefficient is trimmed, in production, using a traditional "Magic Voltage" style trim with measurement and trim performed at a single temperature. This single temperature trim reduces manufacturing costs as compared to a circuit that requires multiple test passes at different temperatures to be properly trimmed. The bandgap reference voltage generating circuit 1 achieves this performance while being realizable in a small size of less than 0.3 square millimeters of integrated circuit area while having a low power consumption of less than 1.5 mW and an output noise of 36 micro $V_{rms}$ above 1 Hz. Advantageously, the bandgap reference voltage generating circuit 1 can be realized using a relatively common BiCMOS process even where the bipolar transistors have a current gain beta (B) of no more than 4.

As seen in FIG. 1, the bandgap reference voltage generating circuit 1 includes a Brokaw-type bandgap cell circuit 2, a tail resistor circuit 3, a high-order curvature compensation current generating circuit 4, an $I_{ZTAT}$ current sink circuit 5 and a start-up circuit 23. The bandgap reference voltage $V_{BG}$ is output onto an output terminal and conductor 6. Supply voltage input terminal AVDD 7 is the analog supply voltage input terminal and conductor. Ground terminal and conductor AGND 8 is the ground terminal and conductor.

The Brokaw bandgap cell circuit 2 includes P-channel transistors 10 and 11, resistors 12 and 13, a first bipolar NPN transistor QA, a second bipolar NPN transistor QB, and a $\Delta V_{BE}$ sense resistor 15. The gates of the P-channel transistors 10 and 11 are coupled together at a gate node 77. The P-channel transistors 10 and 11 and the resistors 12 and 13 together form a current mirror. The first bipolar NPN transistor QA has its emitter E coupled to a tail resistor node 14. The second bipolar NPN transistor QB has its emitter E coupled through the $\Delta V_{BE}$ sense resistor 15 to the same tail resistor node 14. The first bipolar transistor QA has a size factor of 3 whereas the second larger bipolar transistor QB has a size factor of 22.

A first current leg extends from the first P-channel transistor 11 of the current mirror to the collector of the first bipolar transistor QA. This first leg includes P-channel cascode transistors 16 and 17. These P-channel cascode transistors 16 and 17 increase the impedance looking up into the current mirror. The first leg further includes N-channel cascode transistor 18. N-channel cascode transistor 18 increases the impedance looking down into the collector of the first bipolar transistor QA.

A second current leg extends from the second P channel transistor 10 of the current mirror to the collector of the second bipolar transistor QB. This second leg includes P-channel cascode transistors 19 and 20. The resistors 21 and 22 are disposed in the current path of the second leg in order to generate the gate voltages for the P-channel cascode transistors. The P-channel cascode transistors 19 and 20 increase the impedance looking up into the current mirror. The second leg further includes N-channel cascode transistor 24. N-channel cascode transistor 24 increases the impedance looking down into the collector of the second bipolar transistor QB. Oval symbol represents an optional resistor.

The base electrodes of the bipolar transistors QA and QB are coupled together at conductor and node 25 as shown. The base electrodes of the bipolar transistors QA and QB are directly shorted together and there are no intervening switches or junctions or devices or other circuitry. This conductor 25 also extends to the bandgap output terminal and conductor 6. Terminal 6 and node and conductor 25 are all one common "base node."

In one novel aspect, the Brokaw bandgap cell circuit 2 further includes a base current redistribution circuit 26. The base current redistribution circuit 26 is coupled to conduct a first base resupply current 27 from the first current leg and to supply that current 27 onto the base node 25, and is also coupled to conduct a second base resupply current 28 from the second current leg and to supply that current 28 onto the base node 25. The sum of the currents 27 and 28, which is the current output of the base current redistribution circuit 26, is denoted as current 29. The N-channel transistors 30 and 31 of the base current redistribution circuit 26 are of the same size and are tightly matched and are laid out in interdigitated fashion to be as identical to one another as possible. Likewise, the resistors Rr 32 and 33 are tightly matched and laid out to be identical. This ensures that the first and second base resupply currents 27 and 28 are as identical as possible. The current 29 as output from the base current redistribution circuit 26 supplies both the base current 34 into bipolar transistor QA as well as the base current 35 into bipolar transistor QB.

The Brokaw bandgap cell circuit 2 and the tail resistor circuit 3 together generate the bandgap voltage $V_{BG}$ on terminal 6 that does not vary with temperature. This bandgap voltage $V_{BG}$ is generally referred to as having a "zero" temperature coefficient with respect "To Absolute Temperature" (ZTAT). Such a ZTAT voltage is realized by generating a voltage whose magnitude increases in Proportion To Absolute Temperature (PTAT), and by generating a Complementary voltage To Absolute Temperature (CTAT) that decreases with absolute temperature in opposite fashion to the way the PTAT voltage increases with absolute temperature. Summing the two voltages PTAT and CTAT causes the linear temperature-varying components of the PTAT and CTAT voltages to cancel, thereby generating a voltage that changes only slightly with respect to temperature.

The bandgap cell has two stable states. One is with the current desired, and the other is the unwanted state with zero current. The start-up circuit 23 ensures that the bandgap cell is not operating in the zero current state. Start-up circuit 23 draws a very small trickle current from AVDD supply node and conductor 7 and is grounded at AGND node and conductor 8. The start-up circuit 23 senses the voltage at tail resistor node 14, and if that voltage is below a predetermined value then the start-up circuit 23 injects current onto node 39, which in turn causes regeneration in the bandgap cell loop.

FIG. 3 is a diagram that illustrates how the CTAT voltage is generated using the first bipolar NPN transistor QA. The $V_{BE}$ voltage drop across the base-to-emitter PN junction of the NPN transistor QA is given by the equation shown. The T variable in term first term is temperature in degrees Kelvin, so the first term kT/q has a PTAT characteristic and increases with increasing absolute temperature. The second term In(Io/Is) term has a CTAT characteristic and decreases with increasing absolute temperature. As shown in the diagram, the CTAT characteristic of the second term is much stronger than the PTAT characteristic of the first term, so the second term dominates and the overall $V_{BE}$ voltage has a CTAT characteristic. The voltage $V_{BE}$ decreases at approximately −1.6 mV/° C. if the emitter current through the transistor is constant over temperature. The $V_{BE}$ voltage drop across transistor QA is the CTAT voltage to be used in the CTAT/PTAT cancelling of the Brokaw bandgap cell circuit 2.

FIG. 4 is a diagram that illustrates how the PTAT voltage is generated. The diagram at the left of FIG. 4 illustrates two current legs. The left current leg represents the current flowing through the left current leg of the Brokaw cell of FIG. 1. The diode symbol in the left current leg of the diagram of FIG. 4 represents the PN junction from the base-to-emitter of the smaller bipolar transistor QA of FIG. 1. The right current leg in the diagram of FIG. 4 represents the current flowing through the right current leg of the Brokaw cell of FIG. 1. The diode symbol in the right current right current leg of the diagram of FIG. 4 represents the PN junction from the base-to-emitter of the larger bipolar transistor QB of FIG. 1. The voltage difference $\Delta V_{BE}$ between the $V_{BE}$ voltages of the two transistors is given by the equations of FIG. 4. The current in the two legs is made to be the same due to operation of the P-channel current mirror at the top of the Brokaw cell. As shown, the voltage $\Delta V_{BE}$ is a PTAT voltage.

In the Brokaw cell of FIG. 1, due to the bases of the two transistors QA and QB being coupled together, and due to the presence of the $\Delta V_{BE}$ sense resistor 15, the PTAT voltage ($\Delta V_{BE}$ voltage) is dropped across this $\Delta V_{BE}$ sense resistor 15, thereby generating a corresponding PTAT current that is denoted $I_{PTAT}$. This $I_{PTAT}$ current that is flowing from the emitter of the transistor QB is pulled down through the right leg of the Brokaw cell in the diagram of FIG. 1 from the P-channel transistor 10 of the P-channel current mirror at the top of the Brokaw cell. This $I_{PTAT}$ current in the right leg is mirrored by the P-channel transistors 10 and 11 of the mirror so that an identical current $I_{PTAT}$ also flows in the left leg of the Brokaw cell of FIG. 1. The two leg currents merge at node 14. A current of magnitude twice $I_{PTAT}$ therefore flows from the Brokaw cell, from tail resistor node 14, and down through the effective resistance of the tail resistor circuit 3 to analog ground AGND conductor and terminal 8. The voltage at the output $V_{BG}$ terminal 6 (with respect to AGND) of the overall bandgap circuit 1 is the sum of the $V_{BE}$ of the transistor QA, and the voltage drop across the tail resistor circuit 3 between node 14 and analog ground AGND terminal 8. As stated above, the $V_{BE}$ of the transistor QA is CTAT. Because the current of twice $I_{PTAT}$ is PTAT, the resulting voltage drop across the tail resistor circuit 3 is also PTAT. The resistance of the tail resistor circuit 3 is appropriately chosen such that the rate of change of the CTAT voltage component of the $V_{BE}$ of the transistor QA with respect to temperature is equal to the rate of change of the voltage drop across the tail resistor circuit 3 with respect to temperature, and this results in the voltage on the output $V_{BG}$ terminal 6 being ZTAT. The summing of the CTAT voltage signal and the PTAT voltage signal results in the cancellation of the linear portion of the temperature dependent component of the CTAT $V_{BE}$ voltage. The temperature-dependent component of the $V_{BE}$ voltage of a PN diode, however, in addition to the linear varying component, also has higher order components. If no additional curvature correction circuit were employed, then these additional higher order temperature dependent components would not be canceled, and this would introduce an unwanted temperature varying error in the $V_{BG}$ output voltage on terminal 6.

In the Brokaw cell, it is the difference between the emitter currents flowing out the emitters of the bipolar transistors QA and QB that is exploited and employed to cause the $I_{PTAT}$ current to flow in the P-channel current mirror through P-channel transistor 10. This difference in emitter currents gives rise to the differences in $V_{BE}$ illustrated in FIG. 4. If, rather than causing all the current flowing across the sense resistor 15 to be pulled down through the P-channel transistor 10 of the current mirror, only some of the emitter current were made to be pulled down through the transistor 10 then this would introduce an error in $I_{PTAT}$. This error would vary depending on the current gain of the transistor QB over temperature. The current gain of the transistor QB may be low and does vary considerably over temperature. The collector currents flowing into the collectors of the two bipolar transistors QA and QB are not in accurate proportion to absolute temperature. Consider, for example, the emitter current that flows out of the transistor QB of FIG. 1 and through the sense resistor 15. This emitter current is the sum of the collector current flowing into the collector of transistor QB as well as the base current 35 flowing into the base of transistor QB. If only the collector current portion of the emitter current were made to flow down through the P-channel current mirror transistor 10, and if the base current 35 flowing into the base of the transistor QB were to be sourced from another source (for example, from a power supply, through an NMOS source follower, as is typical), then not all of the emitter current of transistor QB would be made to flow in the right current leg down from the P-channel transistor 10 of the current mirror, and as a result the temperature dependency would be introduced into the current $I_{PTAT}$. The base current redistribution circuit 26 solves this problem by drawing the base current 35 of transistor QB not from a separate power supply, but rather from the P-channel transistor 10 so that it contributes to $I_{PTAT}$ flowing in the right current leg of the Brokaw cell. Likewise, the base current redistribution circuit 26 draws the base current 34 of transistor QA from the P-channel transistor 11 so that it contributes to $I_{PTAT}$ flowing in the left current leg of the Brokaw cell.

Figure 5:
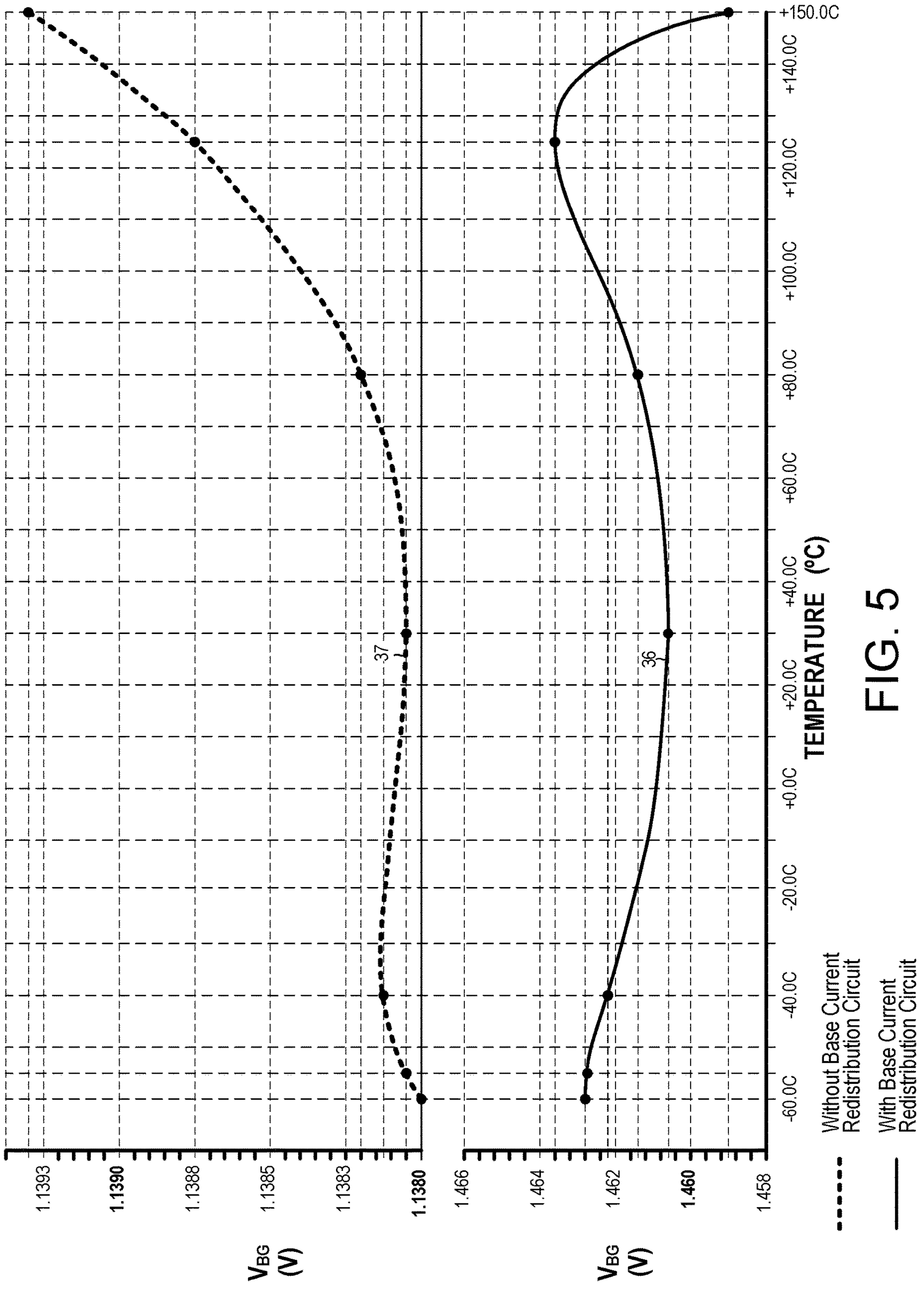
FIG. 5 is a diagram that illustrates how the base current redistribution circuit improves the temperature independence of the bandgap circuit output voltage $V_{BG}$ over a temperature range from −60 degrees Celsius to +150 degrees Celsius.

FIG. 5 is a diagram that illustrates how the base current redistribution circuit 26 improves the temperature independence of the bandgap circuit output voltage $V_{BG}$ on terminal 6 over a temperature range from −60 degrees Celsius to +150 degrees Celsius. In the diagram, the solid line 36 ("With BCC") represents the output voltage $V_{BG}$ on terminal 6 when the base current redistribution circuit 26 is present and working in the overall bandgap circuit 1. In the diagram, the dashed line 37 ("Without BCC") represents the output voltage $V_{BG}$ on terminal 6 when the base current redistribution circuit 26 is not present in the overall bandgap circuit 1 but rather the base currents 34 and 35 flowing into the bases of the bipolar transistors QA and QB are sourced and supplied from a power supply using an NMOS source follower.

Figure 6:
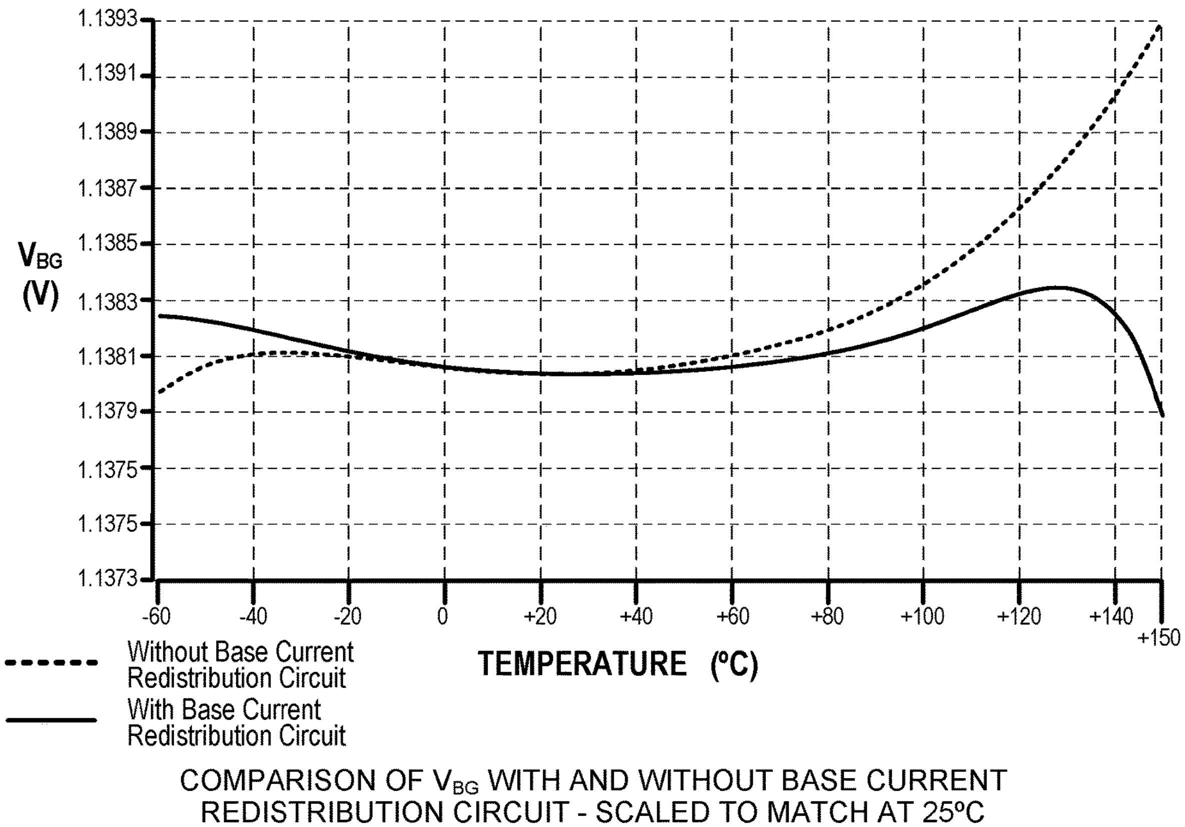
FIG. 6 is a diagram that shows both the "Without BCC" (without base current correction) curve and the "With BCC" (with base current correction) $V_{BG}$-to-temperature curve, but with the "With BCC" curve scaled to match the "Without BCC" curve at +25 degrees Celsius.

FIG. 6 is a diagram that shows both the "Without BCC" and the "With BCC" $V_{BG}$ to temperature curves, but with the "With BCC" scaled to match the "Without BCC" case at 25 degrees Celsius. The "With BCC" is seen to have a flatter profile, indicating that the base current redistribution circuit 26 improves the temperature independence of the bandgap circuit.

It is possible for a base current redistribution circuit to draw the base currents from nodes on the current legs in location below the cascode transistors and circuitry 16, 17, 19-22 in FIG. 1. Base current 35 could, for example, be drawn from the node 38 in the right current leg between resistor 22 and cascode transistor 24. Similarly, the base current 34 could be drawn from the node 39 in the left current leg between cascode transistor 17 and cascode transistor 18. This, however, would result in the overall bandgap circuit 1 having a minimum supply voltage AVDD value that is about 0.5 volts higher than the minimum supply voltage AVDD of 4.3 of the bandgap circuit of FIG. 1. A further degradation is that the output impedances at the drains of N-channel transistors 30 and 31 is relatively low and connecting them at nodes 39 and 38 would significantly reduce the loop gain of the Brokaw cell compared to the connection as shown. In the bandgap circuit of FIG. 1 the base currents are advantageously drawn from nodes on the current legs above the cascode transistors. Being able to operate the overall bandgap circuit 1 at a lower analog supply voltage AVDD (down to a AVDD of 4.3 volts) and with higher loop gain, is a desirable advantage of the bandgap circuit of FIG. 1.

As described above, if there were no curvature correction circuitry then high order temperature dependent components (second order and above) would remain in the QA $V_{BE}$ voltage component of the Brokaw cell that would not be canceled by the Brokaw cell summing of the PTAT and CTAT voltages, and these remaining high order temperature dependent components would manifest themselves directly in corresponding temperature variations in the output voltage $V_{BG}$. These high order temperature dependent components include principally second order components, but also include smaller magnitude higher order components as well. A second order component is a component whose magnitude increases proportional to the square of an increase in temperature.

The high-order curvature compensation current generating circuit 4 generates an output current 40 whose magnitude is to vary with temperature in such a way that it is usable to cancel the temperature dependencies in $V_{BG}$ that remain after Brokaw cell cancelation of the first order temperature dependencies. The output current 40 of the high-order curvature compensation current generating circuit 4 is the drain-to-source current passing through N-channel transistor 41 to AGND node 8. This output current 40 flowing into the drain of transistor 41 is pulled through sixteen identical P-channel current mirrors 42, each with a current gain of ×2. The left input legs of the sixteen P-channel current mirrors are connected together. As a result, sixteen identical output currents 43 are generated. The illustrated P-channel transistors 45 and 46 represent one of these sixteen identical current mirrors. Each of the sixteen identical output currents 43 flows via a separate one of sixteen conductors 44 from the P-channel current mirrors 42 to the tail resistor circuit 3 where it is used for curvature correction.

The high-order curvature compensation current generating circuit 4 includes a P-channel current mirror portion including P-channel transistors 47 and 48 and resistors 49 and 50. The P-channel transistor 10 and the resistor 12 may also be considered to be part of the high-order curvature compensation current generating circuit 4 because these three P-channel transistors (10, 48, 47) together form the current mirror that provides an $I_{PTAT}/2$ current and a $I_{PTAT}/8$ current needed for operation of the circuit 4. The resistor 49 is of a resistance 2*Rd that is twice as large as the resistance Rd of the resistor 12 so that the current $I_{PTAT}/2$ supplied from the drain of P-channel transistor 47 is half the magnitude of the current $I_{PTAT}$ supplied from the drain of P-channel transistor 10. Similarly, resistor 50 is of a resistance 8*Rd that is eight times as large as the resistance Rd of the resistor 12 so that the current $I_{PTAT}/8$ supplied from the drain of P-channel transistor 50 is one eighth the magnitude of the current $I_{PTAT}$ supplied from the drain of P-channel transistor 10. The P-channel transistors 47 48 are the same length and are scaled in width with respect to P-Channel transistor 10 so as to maintain the same current density. The high-order curvature compensation current generating circuit 4 further includes N-channel transistors 51, 52 and 53. The sink current circuit 5 that sinks a ZTAT current $I_{ZTAT}$ 56 from summing node 54 may also be considered to be part of the high-order curvature compensation current generating circuit 4.

The N-channel transistors 51 and 52 are connected in series as shown in FIG. 1 between AGND conductor 8 the drain of P-channel transistor 47 that is supplying the $I_{PTAT}/2$ current. The source of N-channel transistor 51 is coupled to the source of N-channel transistor 41 at the AGND conductor and node 8. The gate of N-channel transistor 51 is coupled to the drain of N-channel transistor 51. The drain of N-channel transistor 51 is also coupled to the source of N-channel transistor 52. The gate of N-channel transistor 52 is coupled to the gate of N-channel transistor 53 so that N-channel transistor 53 will supply a corresponding current 55 onto summing node 54. The $I_{ZTAT}$ current 56 that is sunk from summing node 54 by $I_{ZTAT}$ current sink circuit 5 ideally has no variation over temperature, so temperature variation in the current flow into summing node 54 is due to the circuit 4. In addition to the current 55 from transistor 53, the $I_{PTAT}/8$ current from P-channel transistor 48 of the P-channel current mirror is also supplied onto the summing node 54 in circuit 4, and, because current 56 is temperature independent, the current 55 in N-channel transistor 53 must have a complementary temperature component to the PTAT current from P-channel transistor 48.

Importantly, the four N-channel transistors 51, 52, 53 and 41 are operated in the "near threshold region" of transistor operation. In each transistor, the body contact and electrode of the transistor is connected to the source electrode and contact so as to prevent current flow through a parasitic body diode either from the source diffusion or to the drain diffusion to AGND. In "near threshold region" operation, any current flow through an N-channel transistor is electron flow from its source to its drain. There is no current flow either into, or out of, the body electrode of the transistor.

To a very simplified first approximation, the drain-to-source current of an N-channel transistor operating in this "near threshold region" can be said to vary as an exponential function of the gate-to-source voltage. If the $I_{PTAT}/8$ current that is supplied onto to the summing node 54 (from transistor 48) were not present, then in a very simplified explanation of operation, the circuit 4 would work as a sub-threshold MOS Gilbert trans-linear current squarer. It would convert an input current (in this case, the current $I_{PTAT}$ supplied from mirror transistor 10) into a corresponding $V_{GS}$ voltage that varies exponentially with respect to changes in the input current. One such $V_{GS}$ voltage is generated by each of the two series connected N-channel transistors 52 and 51. The two $V_{GS}$ voltages are added, and the resulting summed $2*V_{GS}$ voltage is converted back into a corresponding drain-to-source current. The transistor 41 operated in its "near threshold" operating region is used to perform this conversion from a voltage back to the output current 40. N-channel transistor 53, operating with a temperature independent current from the $I_{ZTAT}$ current sink generates a temperature dependent voltage that results in a simple linear scaling of the output current 40 compared to the input current $I_{PTAT}/2$. Due to the factor of two, from the addition of the $V_{GS}$ of 51 and 52 the drain-to-source current 40 flowing in N-channel transistor 41 is directly proportional to the square of the input current $I_{PTAT}/2$ flowing through the series connected transistors 52 and 51. Accordingly, if the $I_{PTAT}/8$ current input to summing node 54 were not present, then the output current 40 flowing through transistor 41 would in this simplified explanation be proportional to the square of the input current $I_{PTAT}/2$. It would therefore also be proportional to the square of the current $I_{PTAT}$ flowing in the left and right current legs of the Brokaw cell 2. Such a circuit is therefore sometimes called a "current squarer" circuit. The novel extra $I_{PTAT}/8$ current that is supplied from the added $I_{PTAT}/8$ current leg of the P-channel current mirror (from transistor 48) onto summing node 54 is provided in the novel circuit 4 in order to increase the amount of curvature above a pure square. Rather than the output current 40 varying in direct proportion to the square of the input current (a power of 2.0 of the input current), the output current 40 is made to vary proportional to the input current raised to an order slightly greater than 2.0. The output current 40 may vary as power of approximately 2.1 of the input current. If the magnitude of the current supplied from the P-channel transistor 48 were increased, then the power would be increased. If the magnitude of the current supplied from the P-channel transistor 48 were decreased, then the power would be decreased. The output current 40 that has a PTAT curvature characteristic (as temperature increases, the PTAT increase in current 40 changes proportional to $I_{PTAT}$ to a power of approximately 2.1) is used in the tail resistor circuit 3 to perform curvature correction for the $V_{BG}$ output voltage.

Figure 7:
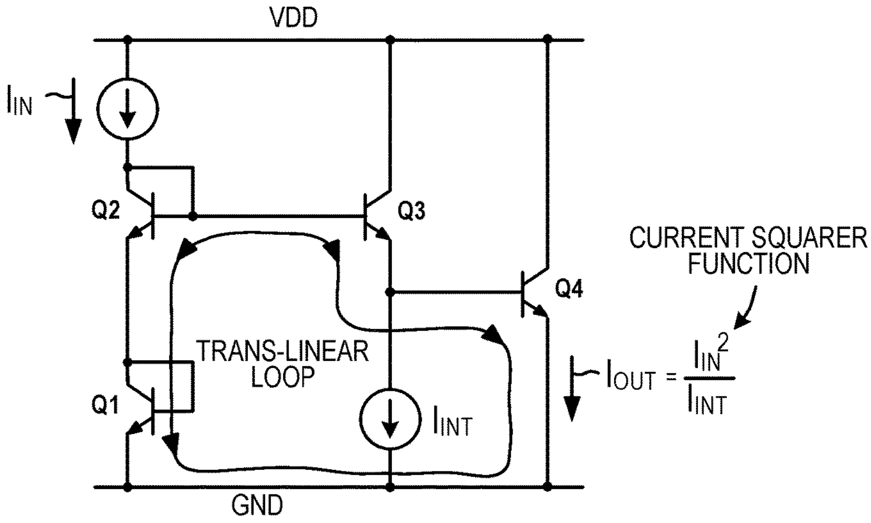
FIG. 7 is an illustrative diagram that shows a Gilbert trans-linear current squarer circuit that employs bipolar transistors.

A more detailed explanation of the high-order curvature compensation current generating circuit 4 is made by considering operation of the bipolar Gilbert trans-linear current squarer circuit of FIG. 7. Rather than MOS transistors, the circuit employs bipolar transistors. In a diode-connected NPN bipolar transistor, because $V_{CE}$ is zero, the transistor has a transfer characteristic as shown in FIG. 3. The base-to-emitter voltage $V_{BE}$ varies in proportion to the natural logarithm of the drain current I divided by the reverse saturation current $I_S$. A trans-linear loop is formed through the base-to-emitter junctions of the four transistors Q1-Q4 as shown. As shown in FIG. 7, the number of clockwise $V_{BE}$ voltage drops is equal to the number of counter-clockwise $V_{BE}$ voltage drops. As shown by the equations of FIG. 8, if the current gain is assumed to be high and if the base currents are ignored, then the output current $I_{OUT}$ is equal to the input current $I_{IN}$ squared, divided by the current $I_{INT}$. If $I_{INT}$ is a constant current, then $I_{INT}$ is just a scaling value. The output current $I_{OUT}$ varies in proportion to the square of the input current $I_{IN}$. The circuit is therefore called a current squarer.

Figure 10:
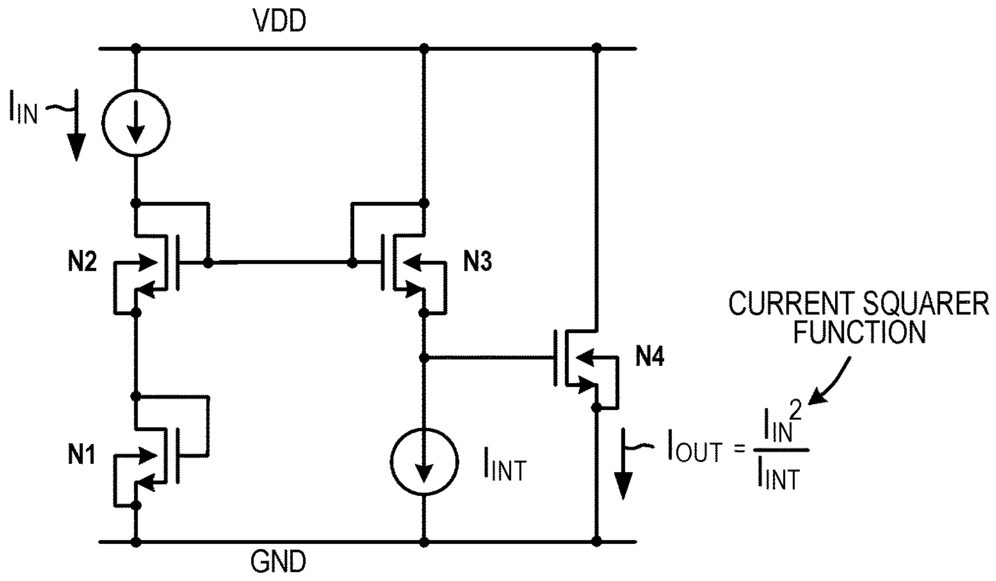
FIG. 10 is an illustrative diagram that shows a Gilbert trans-linear current squarer circuit that employs N-channel transistors operating in the sub-threshold region of operation.

An N-channel transistor operating in its sub-threshold region of operation has a current (drain current) to control voltage ($V_{GS}$) similar that of the current (collector current) to control voltage ($V_{BE}$) relationship of a bipolar transistor. FIG. 9 shows simplified corresponding equations for a bipolar transistor and for a MOS transistor operating in its sub-threshold region of operation. Due to similarities of these equations, the bipolar transistors of the trans-linear squarer of FIG. 7 can be replaced with N-channel transistors operating in the sub-threshold region of operation. FIG. 10 is a diagram of the resulting sub-threshold MOS Gilbert trans-linear current squarer circuit. If the high-order curvature compensation current generating circuit 4 of FIG. 1 were to employ a circuit similar to that of FIG. 10 with its transistors operating in the sub-threshold region, then the N-channel transistors would have to be made very large in order for the circuit to work satisfactorily.

In accordance with one novel aspect, the N-channel transistors 51, 52, 53 and 41 of the high-order curvature compensation current generating circuit 4 of FIG. 1 are not operated in the sub-threshold region of operation, but rather they are operated in what is called their "near threshold" region of operation. Even though the $I_{DS}$ to $V_{GS}$ relationship of the transistors is not purely exponential for an N-channel transistor operating in this "near threshold" region of operation, it is possible to for the squarer circuit topology to approximate the squarer function by slightly raising the order of the power function of the circuit. This is done by adding in the extra $I_{PTAT}/8$ current onto the summing node 54 in the circuit of FIG. 1. This extra scaled PTAT current that is injected onto summing node 54 so that it subtracts slightly from $I_{ZTAT}$ at the summing node 54, thereby effectively converting the $I_{ZTAT}$ current to be a mildly CTAT current. This allows the circuit 4 to work satisfactorily using N-channel transistors operating in the "near threshold" region of operation. This in turn allows the N-channel transistors to be made smaller and for the effects of device-to-device threshold voltage mismatch to be mitigated.

Figure 11:
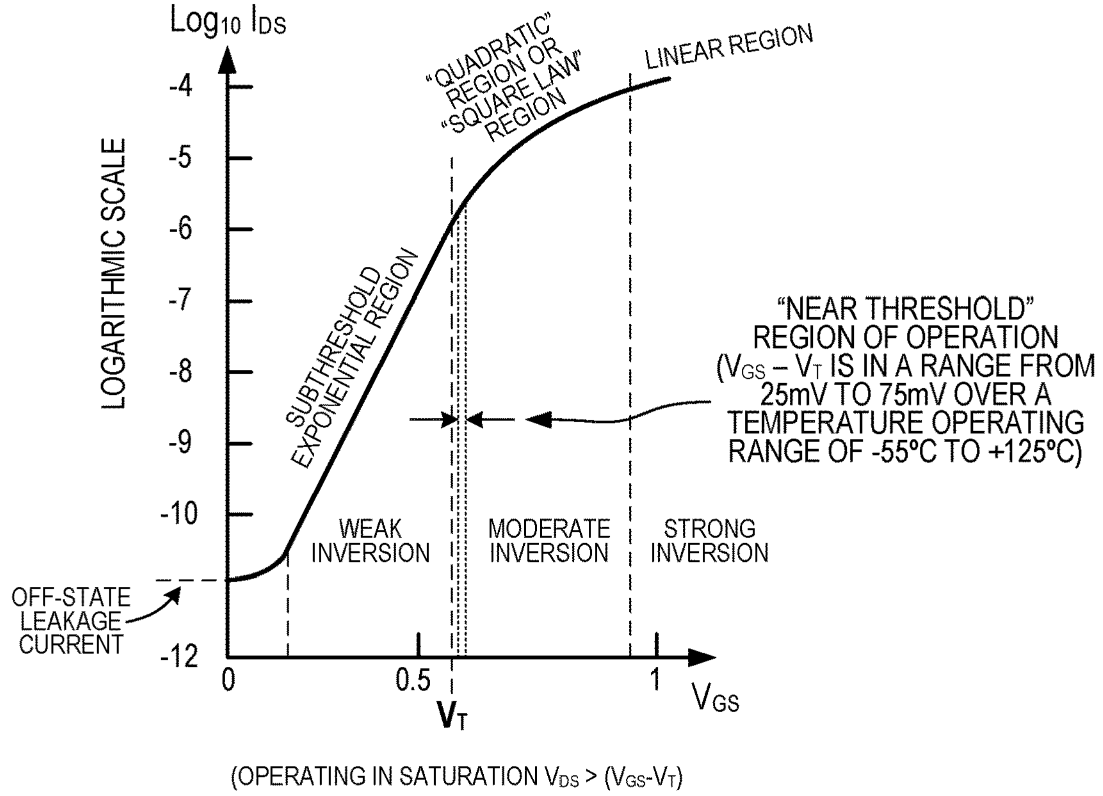
FIG. 11 is a diagram that illustrates the "near threshold" region of transistor operation.

FIG. 11 is a diagram that plots $V_{GS}$ to $I_{DS}$, where the drain-to-source current $I_{DS}$ is plotted on a logarithmic scale. For a $V_{GS}$ below the threshold voltage $V_T$, the drain-to-source $I_{DS}$ current increases exponentially with respect to increasing $V_{GS}$. If the transistor is operated at a $V_{GS}$ that is in a small range that is slightly above $V_T$ as shown, however, the drain-to-source $I_{DS}$ current increases less rapidly with increasing $V_{GS}$. This is said to be the "quadratic" region of operation or the "square-law" region of operation. The transition is not, as can be seen from FIG. 4, abrupt. What is referred to here as the "near threshold" region of operation is for $V_{GS}$ voltages in a range that is 25 mV to 75 mV greater that $V_T$. $V_T$, which is kT/q, is approximately 26 mV at room temperature. The $V_{GS}$ voltages of the N-channel transistors 41, 51, 52 and 53 of the high-order curvature compensation current generating circuit 4 of FIG. 1 only vary 2:1 over PVT, so as can be seen from the diagram of FIG. 11 the variation of $V_{GS}$ in these transistors is so small that the transistors always operate in the near threshold region.

The function of the $I_{ZTAT}$ current sink circuit 5 is to sink the current $I_{ZTAT}$ 56 that has a zero temperature coefficient. The output voltage signal $V_{BG}$ from output terminal 6 is used to generate a corresponding constant current 57. The operational amplifier 58 receives the $V_{BG}$ voltage on its non-inverting input lead, and operates to control N-channel transistor 59 so that the voltage between the non-inverting input lead of the operational amplifier 58 and the inverting input lead of the operational amplifier 58 is zero. This results in the ZTAT voltage $V_{BG}$ being dropped across the resistor 60, so, provided that resistor 60 is a low TC resistor, the current 57 is also nominally $I_{ZTAT}$. This ZTAT current is mirrored by a P-channel current mirror formed of P-channel transistors 61 and 62, and is further mirrored by an N-channel current mirror formed of N-channel transistors 63 and 64 so as to pull a ZTAT current 56 from the high-order curvature compensation current generating circuit 4.

Figure 12:
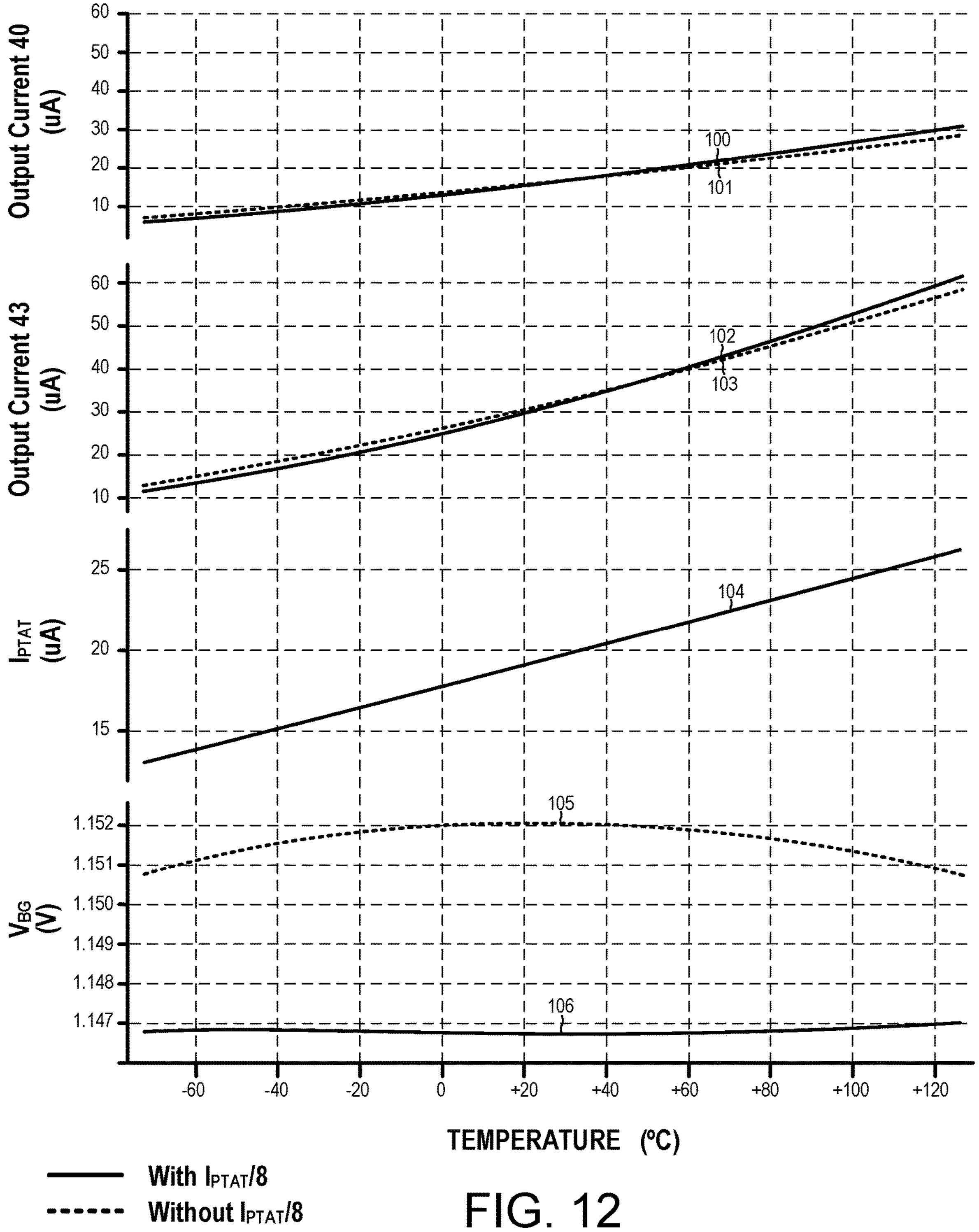
FIG. 12 is a diagram that illustrates how the added $I_{PTAT}/8$ current from transistor 48 of the P-channel current mirror (as supplied onto the summing node 54) improves curvature compensation and results in the output reference voltage $V_{BG}$ having less variation over temperature.

FIG. 12 is a signal diagram that illustrates how the added $I_{PTAT}/8$ current from transistor 48 of the P-channel current mirror (as supplied onto the summing node 54) improves curvature compensation and results in the $V_{BG}$ voltage having less variation over temperature.

Line 100 represents the output current 40 of the high-order curvature compensation current generating circuit 4 in a condition in which there is no $I_{PTAT}/8$ supplied onto the summing node 54.

Line 101 represents the output current 40 of the high-order curvature compensation current generating circuit 4 in a condition in which the current $I_{PTAT}/8$ is being supplied onto the summing node 54.

Line 102 represents the sum of the sixteen output currents 43 (as output by the sixteen P-channel current mirrors 42) in a condition in which there is no $I_{PTAT}/8$ supplied onto the summing node 54.

Line 103 represents the sum of the sixteen output currents 43 (as output by the sixteen P-channel current mirrors 42) in a condition in which the current $I_{PTAT}/8$ is being supplied onto the summing node 54.

Line 104 represents the current $I_{PTAT}$ (as output by transistor 10 of the current mirror in the Brokaw bandgap cell 2) in a condition in which there is no current $I_{PTAT}/8$ supplied onto the summing node 54, as well as in a condition in which the current $I_{PTAT}/8$ is being supplied onto the summing node 54. Only one line 104 is shown because the line is substantially the same for both conditions.

Line 105 represents the bandgap output voltage $V_{BG}$ (as output onto output conductor 6 of the bandgap circuit 1) in a condition in which there is no current $I_{PTAT}/8$ supplied onto the summing node 54.

Line 106 represents the bandgap output voltage $V_{BG}$ (as output onto output conductor 6 of the bandgap circuit 1) in a condition in which the current $I_{PTAT}/8$ is being supplied onto the summing node 54

The tail resistor circuit 3 includes a resistor string including resistors R1T to R14T connected serially between the tail resistor node 14 (at the output of the bandgap circuit 2) and the AGND conductor and terminal 8. The tail resistor circuit 3 further comprises a 1-to-15 analog demultiplexer switch 65 that can programmably couple a selected one of fifteen tap nodes on the Rtail resistor string to conductor 66 and to a current mirror leg involving P-channel transistor 67 and resistor 68. A four-bit digital value loaded into register bits 69 controls the multiplexer switch 65 so that a mirror current $I_{PTAT}/8$ from the leg of the current mirror is steered onto a selected one of the fifteen tap nodes of the Rtail resistor string. The tail resistor circuit 3 further includes a 1-to-32 analog demultiplexer switch 70 and a Rsubtail resistor string of thirty-two serially connected resistors R1ST-R32ST. A five-bit digital value loaded into register bits 71 determines which one of the thirty-two tap nodes of the Rsubtail resistor string will receive an $I_{PTAT}/4$ current via conductor 72 from a current mirror leg involving P-channel transistor 73 and resistor 74.

The top end node 78 of the Rsubtail resistor string is coupled to the tap node 79 on the Rtail resistor string between resistors R5T and R6T as shown in FIG. 1. As shown in FIG. 1, the end node 78 of the Rsubtail resistor string is the same electrical equipotential node as the tap node 79 on the Rtail resistor string between resistors R5T and R6T. In another embodiment, an additional resistor of the Rsubtail resistor string is provided between the points labeled 78 and 79 in FIG. 1.

In addition to the two analog demultiplexer switches 65 and 70, the tail resistor circuit 3 further includes sixteen identical 1-to-2 analog demultiplexer switches. These sixteen 1-to-2 analog demultiplexer switches are identified by the dashed line symbol 75 in FIG. 1. Each of the sixteen output current conductors 44 originating from the high-order curvature compensation current generating circuit 4 is coupled to a corresponding one of the sixteen 1-to-2 analog demultiplexer switches 75. Each of these 1-to-2 analog demultiplexer switches can programmably couple the output current 43 that is coupled onto its input lead onto either the tap node of the Rtail resistor string between resistors R6T and R7T, or onto the tap node of the Rtail resistor string between resistors R7T and R8T. The upper output nodes of the sixteen switch pairs are shorted together, so that a single conductor extends to the tap node on the Rtail resistor string at the top of resistor R7T. Likewise, the lower output nodes of the sixteen switch pairs are shorted together, so that a single conductor extends to the tap node on the Rtail resistor string at the bottom of resistor R7T. Each of the 1-to-2 analog demultiplexer switches 75 is controlled by a corresponding digital bit value stored in sixteen-bit register 76. The digital values in the register bits 69, 71 and 76 are loaded and set during integrated circuit calibration and testing. The bandgap reference voltage generating circuit 1 is trimmable by setting the values in register bits 69, 71 and 76 with appropriate digital values. As implemented in the embodiment of FIG. 1 the register bit value in register 71 provides a very fine control of the linear temperature coefficient (TC) with approximately 1 ppm/C/code granularity.

The register bit value in register 66 provides a coarser control of the linear temperature coefficient with a granularity of 4 ppm/C/code. The register bit value in register 76 provides simultaneous control of both the level of curvature correction applied and also the linear temperature coefficient at a granularity of 4 ppm/C/code (Linear TC). Trimming the value in register 76 to increase curvature correction and TC, while simultaneously trimming the value in register 66 to decrease the linear TC advantageously allows curvature to be increased without any significant change to the linear TC.

In one example, the registers 69, 71 and 76 together form a larger shift register and are serially programmed with register bit values. In another example, the registers 69, 71 and 76 are loaded in parallel.

In the circuit diagram of FIG. 1, there are oval symbols 90-96. These oval symbols 90-95 represent additional optional circuitry. Symbol 90 represents a diode-connect N-channel transistor through which N-channel transistor 52 receives the $I_{PTAT/2}$ current from transistor 47. Symbol 91 represents a cascode N-channel transistor coupled between the drain of N-channel 53 and the supply voltage conductor 7. The gate of the cascode N-channel transistor represented by symbol 91 is biased by the diode-connected transistor represented by symbol 90. The gate of diode-connected transistor 90 is connected to the gate of cascode transistor 91. The purposes of the extra devices 90 and 91 is to ensure that the $V_{DS}$ of transistor 53 matches the $V_{DS}$ of transistor 52. Oval symbol 92 represents another cascode N-channel transistor. The gate of 92 is connected to node 57. All of these optional extra devices 90, 91 and 92 have their bodies coupled to their sources. In the P-channel current mirrors 42, there is an oval symbol 93 an oval symbol 94 that together form what is called a compact cascode. Each of the sixteen P-channel current mirrors has such a pair of devices. The device 93 is a P-channel cascode for transistor 45, and device 94 is a P-channel cascode for transistor 46. The gates of the compact cascode devices 93 and 94 are coupled together, and they receive a bias current from another leg of the $I_{ZTAT}$ current sink circuit 5 so that the $V_{DS}$ of transistors 45 and 46 is as low as it reasonably can be, so that devices 45 and 46 are just barely saturated. In the $I_{ZTAT}$ current sink circuit 5 there is another current mirror leg (in parallel with the current mirror leg of transistor 64), and this other current mirror leg supplies the bias current for the compact cascodes of the sixteen P-channel current mirrors 42. There is a cascode transistor, however, in this current path. The oval symbol 95 in the $I_{ZTAT}$ current sink circuit 5 represents a diode-connected N-channel transistor, and the gate of this diode-connected N-channel device 95 provides the gate voltage for the cascode transistor (the cascode transistor in the current path between the drain of the N-channel transistor of the extra current mirror leg (in parallel with transistor 64) of circuit 5 and the compact cascodes of the sixteen P-channel current mirrors 42. Although transistors 51, 52, 53, and 41 of the high-order curvature compensation current generating circuit 4 are made to operate in the near threshold region as described above (see FIG. 10), the P-channel current mirror transistors of the sixteen P-channel current mirrors 42 are biased in the triode region. Oval symbol 96 represents an optional resistor.

Although in the embodiment of the circuit 1 of FIG. 1 the two currents 27 and 28 drawn by the base current redistribution circuit 26 are identical and the currents in bipolar transistors QA and QB are also identical, in another embodiment the currents in bipolar transistors QA and QB are ratioed and are unequal. For example, to reduce the die area of the circuit, bipolar transistor QB is made smaller by a factor of two. The currents in bipolar transistor QB, P-channel transistors 10,19,20, N-channel transistor 31 and resistors 33, 12, 21, 22 and 15 are all reduced by the scale factor of two. To maintain the same current densities and voltages, P-channel transistors 11, 19, 20, and N-channel transistor 31 are reduced by a factor of two in width. Resistors 15, 33, 21 and 22 increase in value by a factor of two. The tail resistor circuit 3 increases in resistance by a factor of 4/3. Importantly the current density per unit width, in all devices is unchanged.

In another embodiment, the topology of the entire circuit 1 of FIG. 1 is inverted such that the output voltage $V_{BG}$ is referenced to the power supply voltage AVDD. In the case of the inverted embodiment, the NPN transistor of FIG. 1 becomes a PNP transistor, the P-channel transistors of FIG. 1 become N-channel transistors, the N-channel transistors of FIG. 1 become P-channel transistors, the supply nodes of FIG. 1 become ground nodes, and the ground nodes of FIG. 1 become supply voltage nodes. In some applications, there is an advantage to having a reference voltage such as $V_{BG}$ that is relative to the supply voltage AVDD.

Although certain specific embodiments are described above for instructional purposes, the teachings of this patent document have general applicability and are not limited to the specific embodiments described above. Accordingly, various modifications, adaptations, and combinations of various features of the described embodiments can be practiced without departing from the scope of the invention as set forth in the claims.

What is claimed is:

1. A current generating circuit, comprising:

a first current mirror formed of a first P-channel transistor, a second P channel transistor, and a third P-channel transistor, wherein a gate of the first P-channel transistor is coupled to a gate of the second P-channel transistor and to a gate of the third P-channel transistor, wherein the first current mirror supplies a first mirror output current that has a current magnitude from the first P-channel transistor, wherein the first current mirror supplies a second mirror output current that has a current magnitude from the second P-channel transistor, wherein the first current mirror supplies a third mirror output current that has a current magnitude from the third P-channel transistor, and wherein the magnitude of the second mirror output current is a fraction of the magnitude of the third mirror output current;

a ground conductor;

a first N-channel transistor having a source, a drain, and a gate, wherein the gate is coupled to the drain;

a second N-channel transistor having a source, a drain, and a gate, wherein the gate is coupled to the drain, and wherein the source of the second N-channel transistor is coupled to the drain of the first N-channel transistor, and wherein the drain of the second N-channel transistor is coupled to receive the third mirror output current from the third P-channel transistor of the first current mirror;

a third N-channel transistor having a source, a drain and a gate, wherein the gate of the third N-channel transistor is coupled to the gate of the second N-channel transistor;

a fourth N-channel transistor having a source, a drain and a gate, wherein the source of the fourth N-channel transistor is coupled to the source of the first N-channel transistor at the ground conductor, and wherein the gate of the fourth N-channel transistor is coupled to the source of the third N-channel transistor at a summing node, wherein the second P-channel transistor of the first current mirror supplies the second mirror output current to the summing node, and wherein an output current of the current generating circuit is conducted into and through the fourth N-channel transistor; and a sink current circuit coupled to sink a sink current from the summing node.

2. The current generating circuit of claim 1, wherein the output current of the current generating circuit is a current that flows into the drain of the fourth N-channel transistor.

3. The current generating circuit of claim 1, wherein each of the first, second, third and fourth N-channel transistors has a gate-to-source voltage $V_{GS}$ and a threshold voltage $V_T$, and wherein each of the first, second, third and fourth N-channel transistors operates in its near threshold region of transistor operation such that $V_{GS}$ minus $V_T$ remains in a range from 25 millivolts to 75 millivolts over a temperature operating range from −40 degrees Celsius to +125 degrees Celsius.

4. The current generating circuit of claim 1, further comprising:

a second current mirror formed of a fourth P-channel transistor and a fifth P-channel transistor, wherein a gate of the fourth P-channel transistor is coupled to a gate of the fifth P-channel transistor, wherein the drain of the fourth N-channel transistor is coupled to receive the output current of the current generating circuit from the fourth P-channel transistor of the second current mirror, wherein a second output current flows from the drain of the fifth P-channel transistor; and an output current conductor through which the second output current from the fifth P-channel transistor of the second current mirror flows.

5. The current generating circuit of claim 1, wherein the drain of the second N-channel transistor receives the third mirror output current from the third P-channel transistor of the first current mirror through a diode-connected N-channel transistor.

6. The current generating circuit of claim 1, further comprising:

a supply voltage conductor, wherein the drain of the third N-channel transistor is coupled to the supply voltage conductor through a cascode transistor.

7. The current generating circuit of claim 1, wherein the drain of the second N-channel transistor receives the third mirror output current from the third P-channel transistor of the first current mirror through a diode-connected N-channel transistor, wherein the drain of the third N-channel transistor is coupled to a supply voltage conductor through an N-channel cascode transistor, and wherein a gate of the N-channel cascode transistor is coupled to a gate of the diode-connected N-channel transistor.

8. The current generating circuit of claim 4, wherein the second output current is supplied to a tail resistor circuit, wherein the first P-channel transistor is a part of a bandgap cell, and wherein the tail resistor circuit draws a current from the bandgap cell.

9. The current generating circuit of claim 1, wherein the sink current circuit receives a bandgap reference voltage signal and uses the bandgap reference voltage signal to generate the sink current.

10. A method comprising:

(a) mirroring a first mirror current to generate a second mirror current and a third mirror current, wherein the second mirror current has a current magnitude, wherein the third mirror current has a current magnitude, wherein the current magnitude of the second mirror current is a fraction of the current magnitude of the third mirror current;

(b) conducting the third mirror current serially through a second N-channel transistor and a first N-channel transistor to a ground conductor, wherein a gate of the second N-channel transistor is coupled to a drain of the second N-channel transistor, wherein a gate of the first N-channel transistor is coupled to a drain of the first N-channel transistor, and wherein the drain of the first N-channel transistor is coupled to the source of the second N-channel transistor;

(c) conducting a first current through a third N-channel transistor onto a summing node, wherein a gate of the third N-channel transistor is coupled to the gate of the second N-channel transistor;

(d) conducting the second mirror current onto the summing node;

(e) sinking a sink current from the summing node; and (f) conducting an output current into a drain of a fourth N-channel transistor, wherein a gate of the fourth N-channel transistor is coupled to the summing node, and wherein a source of the fourth N-channel transistor is coupled at the ground conductor to a source of the first N-channel transistor.

11. The method of claim 10, wherein the first current is conducted in (c) through a cascode transistor from a supply voltage conductor, to the drain of the third N-channel transistor, through the third N-channel transistor, and from a source of the third N-channel transistor to the summing node.

12. The method of claim 10, wherein each of the first, second, third and fourth N-channel transistors has a gate-to-source voltage $V_{GS}$ and a threshold voltage $V_T$, and wherein each of the first, second, third and fourth N-channel transistors operates in its near threshold region of transistor operation such that $V_{GS}$ minus $V_T$ remains in a range from 25 millivolts to 75 millivolts over a temperature operating range from −40 degrees Celsius to +125 degrees Celsius.

13. The method of claim 10, wherein the first mirror current is a PTAT current (proportional to absolute temperature).

14. The method of claim 10, wherein the sinking of the sink current in (e) includes receiving a bandgap reference voltage signal and using the bandgap reference voltage signal to generate the sink current.

15. The method of claim 10, further comprising:

(g) mirroring the output current flowing into the drain of the fourth N-channel transistor so as to generate a second output current; and (h) using an analog demultiplexer switch to supply the second output current onto a selected one of a plurality of tap nodes of a resistor string.

16. The method of claim 10, further comprising:

(g) mirroring the output current flowing into the drain of the fourth N-channel transistor so as to generate a second output current;

(h) using an analog demultiplexer switch to supply the second output current onto a selected one of a plurality of tap nodes of a resistor string;

(i) conducting the first mirror current through a first current leg of a bandgap cell; and (j) mirroring the first mirror current to generate a fourth mirror current and conducting the fourth mirror current through a second current leg of the bandgap cell, wherein the resistor string of (h) is coupled to conduct current from a tail resistor node of the bandgap cell and through the resistor string and to a ground conductor.

17. A current generating circuit, comprising:

a current mirror that outputs a first mirror output current, a second mirror output current, and a third mirror output current, wherein a magnitude of the second mirror output current is a fraction of a magnitude of the third mirror output current;

a ground conductor;

a first diode-connected N-channel transistor and a second diode-connected N-channel transistor coupled in series to conduct the third mirror output current from the current mirror to the ground conductor;

a third N-channel transistor having a source, a drain and a gate, wherein the gate of the third N-channel transistor is coupled to a gate of the second diode-connected N-channel transistor;

a fourth N-channel transistor having a source, a drain and a gate, wherein the source of the fourth N-channel transistor is coupled to a source of the first diode-connected N-channel transistor at the ground conductor, wherein the gate of the fourth N-channel transistor is coupled to the source of the third N-channel transistor at a summing node, wherein the second mirror output current is supplied onto the summing node, and wherein an output current of the current generating circuit is conducted into and through the fourth N-channel transistor; and a sink current circuit coupled to sink a sink current from the summing node.

18. The current generating circuit of claim 17, wherein the output current of the current generating circuit is mirrored to generate a second output current, wherein the second output current is supplied to a tail resistor circuit, wherein the first mirror output current is a current flowing in a bandgap cell, and wherein the tail resistor circuit draws a current from the bandgap cell.

19. The current generating circuit of claim 17, wherein each of the first, second, third and fourth N-channel transistors has a body contact and a source, wherein the body contact and the source of each the first, second, third and fourth N-channel transistors are connected together but separately from each other.

20. The current generating circuit of claim 17, wherein each of the first, second, third and fourth N-channel transistors has a gate-to-source voltage $V_{GS}$ and a threshold voltage $V_T$, and wherein each of the first, second, third and fourth N-channel transistors operates in its near threshold region of transistor operation such that $V_{GS}$ minus $V_T$ remains in a range from 25 millivolts to 75 millivolts over a temperature operating range from −40 degrees Celsius to +125 degrees Celsius.

21. A bandgap reference circuit, comprising:

a bandgap cell, wherein a first mirror output current flows in a first leg of the bandgap cell, and wherein a fourth mirror output current flows in a second leg of the bandgap cell;

a current generating circuit, comprising:

a current mirror that outputs a second mirror output current and a third mirror output current, wherein a magnitude of the second mirror output current is a fraction of a magnitude of the third mirror output current;

a ground conductor;

a first diode-connected N-channel transistor and a second diode-connected N-channel transistor coupled in series to conduct the third mirror output current from the current mirror to the ground conductor;

a third N-channel transistor having a source, a drain and a gate, wherein the gate of the third N-channel transistor is coupled to a gate of the second diode-connected N-channel transistor;

a fourth N-channel transistor having a source, a drain and a gate, wherein the source of the fourth N-channel transistor is coupled to a source of the first diode-connected N-channel transistor at the ground conductor, wherein the gate of the fourth N-channel transistor is coupled to the source of the third N-channel transistor at a summing node, wherein the second mirror output current is supplied onto the summing node, and wherein an output current of the current generating circuit is conducted into and through the fourth N-channel transistor; and a sink current circuit coupled to sink a sink current from the summing node;

a second current mirror that mirrors the output current of the current generating circuit thereby generating a second output current; and a trimmable tail resistor circuit that draws a current from the bandgap cell, wherein the trimmable tail resistor circuit receives the second output current from the second current mirror.

22. The bandgap reference cell of claim 21, wherein the trimmable tail resistor circuit comprises a resistor string and an analog demultiplexer switch and a register, wherein the analog demultiplexer switch supplies the second output current onto a selected one of a plurality of tap nodes of the resistor string, and wherein a digital value stored in the register determines which of the plurality of tap nodes is the selected one.

* * * * *